Oct. 6, 1964
J. R. BURNS ET AL
3,151,591
HEAT BONDING APPARATUS
Filed Oct. 7, 1960
3 Sheets-Sheet 2
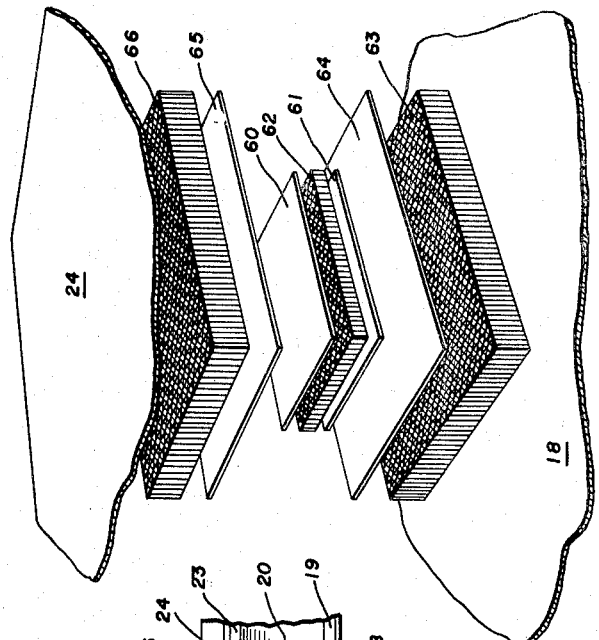
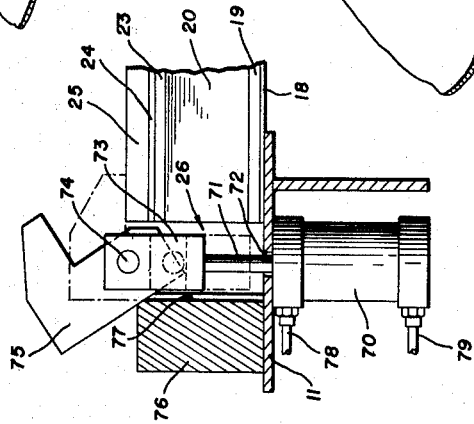
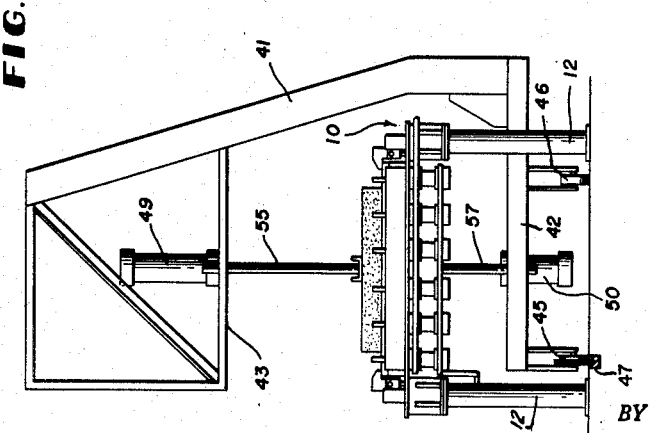
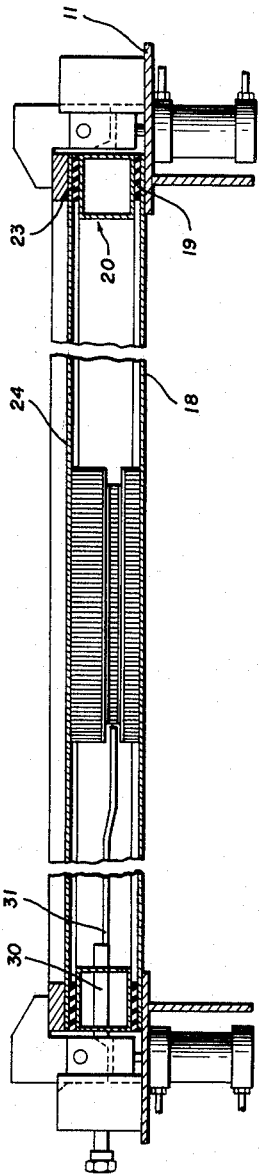
INVENTOR.
JOSEPH R. BURNS
CHARLES W. CAMPBELL
STERLING NOWKA
BY Bean, Brooks, Buckley & Bean
ATTORNEYS Oct. 6, 1964  J. R. BURNS ET AL  3,151,591
HEAT BONDING APPARATUS
Filed Oct. 7, 1960  3 Sheets-Sheet 3
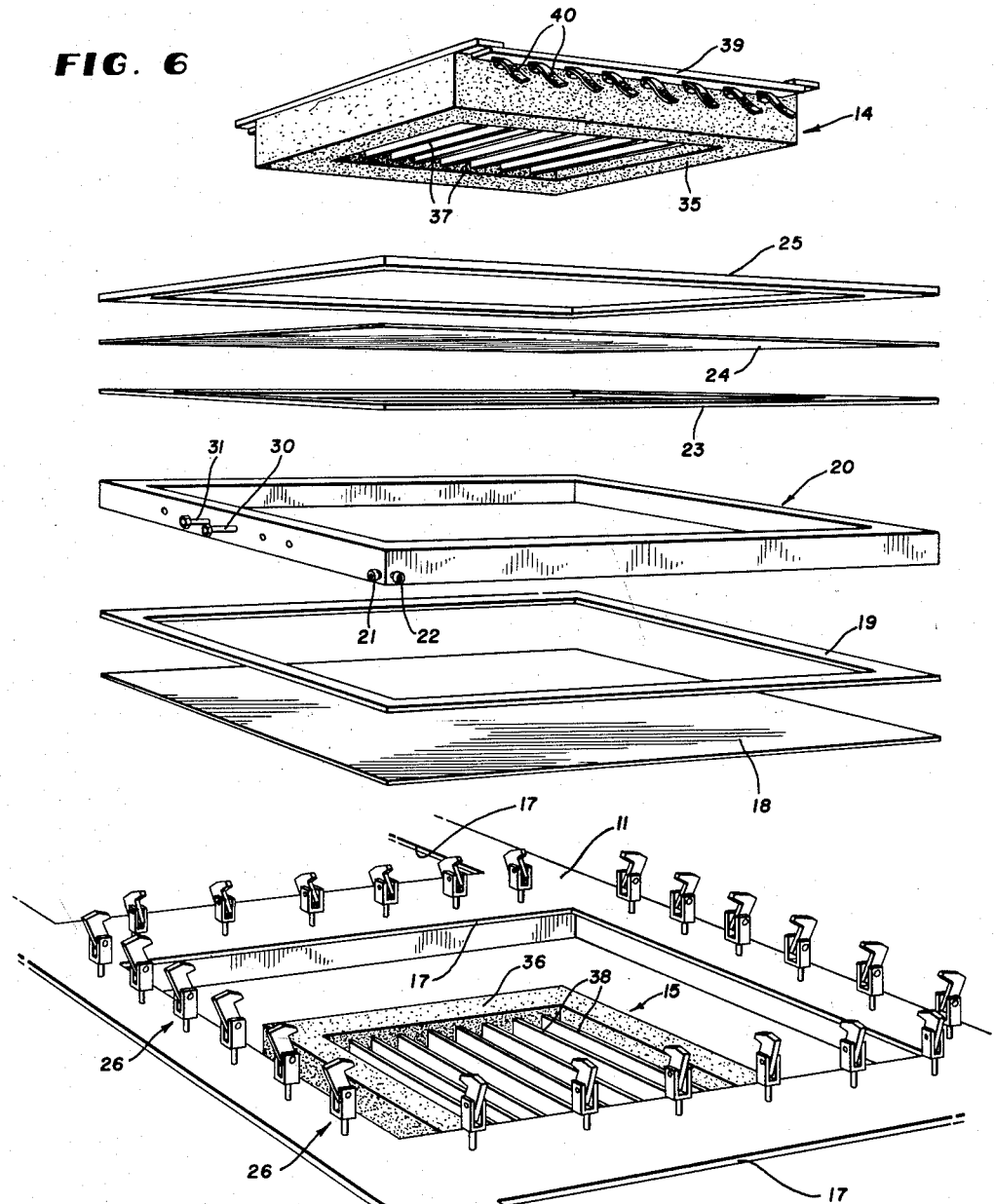
FIG. 6
FIG. 8
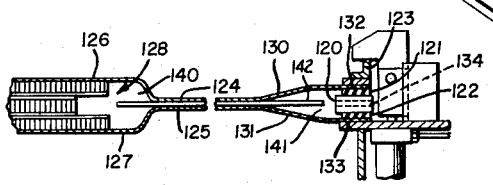
INVENTOR.
JOSEPH R. BURNS
CHARLES W. CAMPBELL
STERLING NOWKA
BY
Beau, Brooks, Buckley & Beau,
ATTORNEYS

United States Patent Office 3,151,591
Patented Oct. 6, 1964

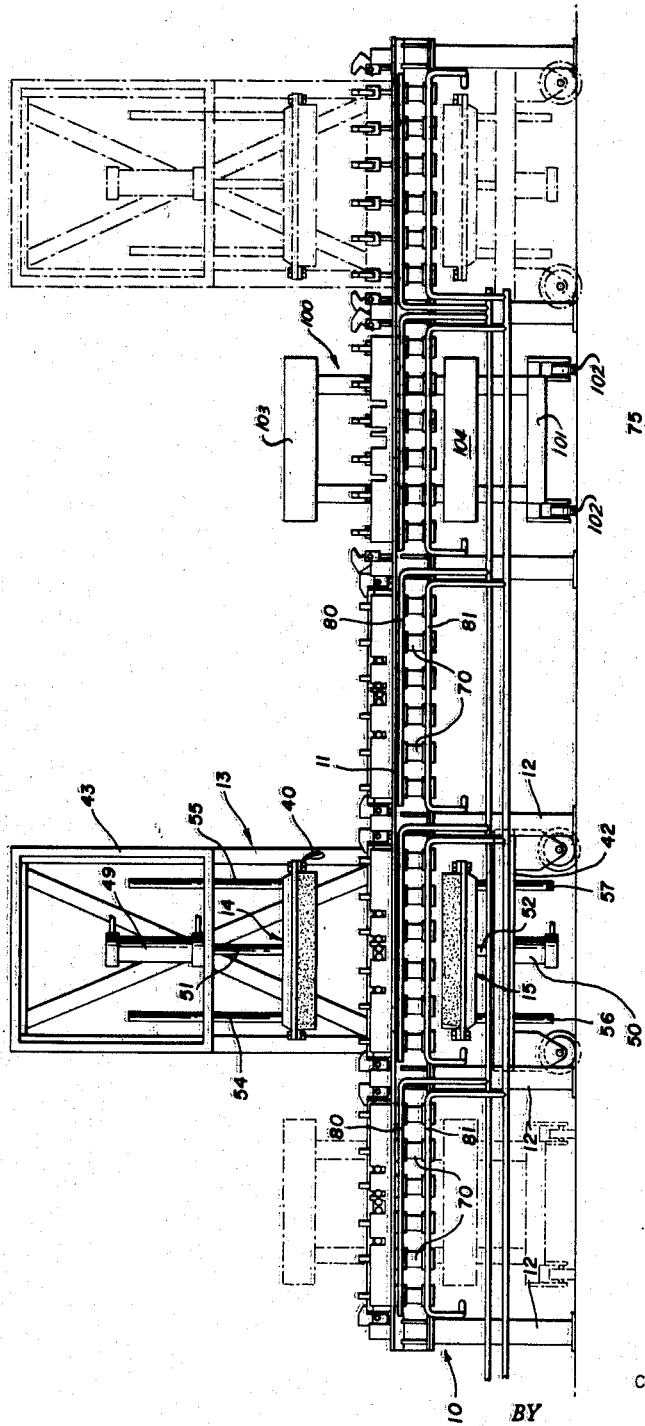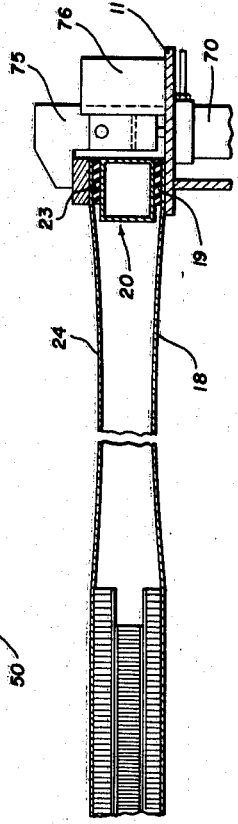

3,151,591
HEAT BONDING APPARATUS
Joseph R. Burns, Tonawanda, Charles W. Campbell, Buffalo, and Sterling Nowka, North Tonawanda, N.Y., assignors to Bell Aerospace Corporation, Wheatfield, N.Y.
Filed Oct. 7, 1960, Ser. No. 61,197
3 Claims. (Cl. 113—59)

This invention relates to apparatus for performing bonding operations and pertains more particularly to such apparatus having plural work stations permitting simultaneous or sequential operations.

Apparatus used for bonding, for example high temperature furnaces for sintering, brazing, heat treating, high temperature vacuum forming, and other high temperature processing, are usually of relatively complicated design and construction and are, consequently, rather costly. Moreover, such apparatus is designed to accommodate the workpieces or other objects in such manner as to permit but a single operation relative thereto and the time required to place the work and to ready the apparatus for the single bonding operation is normally quite time consuming, all to the detriment of flexibility in operation. It is, therefore, of primary concern in connection with the present invention to provide for improvements in the construction and operation of such apparatus as to enable the workpiece or other objects to be properly positioned and readied for the bonding operation in a minimum of time and to provide also for improvements permitting the apparatus to be so constructed as to easily accommodate a plurality of stations whereby sequential or simultaneous operations may be perfomed at the several stations.

A further object of the invention resides in the provision of certain improvements in the construction of the aforementioned apparatus whereby a work enclosure device is utilized having a flexible wall portion or portions capable of properly holding the work by virtue of its flexing under the influence of reduced pressure within the enclosure during the bonding operation.

Another object of this invention resides in the provision of novel work enclosure means employing a chill frame of open form sealingly engaged peripherally with flexible top and bottom walls between which the work is positioned, heat being applied to the walls and therethrough to the work, the chill frame being capable of absorbing heat sufficiently as to permit the use of relatively low temperature sealing means such as rubber or the like between the chill frame and the walls.

A further object of this invention resides in the provision of a furnace assembly in which one of the essential component parts thereof is in the form of a container of hollow, box-like configuration having bottom and top walls, both of which are relatively flexible and formed of relatively thin sheet-like material, the workpieces being placed in the enclosure formed by the container and sandwiched between the top and bottom walls thereof in response to reduction of pressure within the enclosure, the heating device or devices of the furnace structure being closely spaced relative either to one or both of the top and bottom walls so as to provide the necessary heating effect by radiation and convection.

It is a further object of this invention to provide a furnace structure essentially in conformity with the foregoing object wherein either one or both of the top and bottom walls is movable so as to permit of ready accessibility to the interior of the work enclosure component and wherein sealing means is employed between that removable portion or portions of the work enclosure mechanism and the remainder of the work enclosure construction which sealing means is in the form of a resilient gasket which normally would be unable to withstand the heat generated in the area of such work enclosure mechanism, but wherein means is provided for artificially cooling the work enclosure mechanism in the vicinity of such gasket during the brazing or like operation. In this fashion, quickly removable clamping means may be utilized for effecting the seal as provided for by the gasket wherein ready accessibility into the interior of the work enclosure construction is afforded.

More specifically, in accordance with the present invention, there is provided a work enclosure mechanism in the form of superposed, separable sections, the lower of which forms the bottom wall of the work enclosure means and is in the form of a relatively light weight sheet of metal, an intermediate frame member of open, rectangular configuration, and a top wall superposed upon the frame constructed similar to the bottom wall, and with there being gaskets disposed between the two walls and the frame so that the several separable portions of the work enclosure means may be clamped together in the peripheral area thereof so as to form a relatively airtight enclosure for workpieces held between the top and bottom walls. The frame member in most cases will be hollow and provided with means for circulating water or other coolant therein so that the same remains at a sufficiently low temperature as to prevent heat damage to the gasket means in contact therewith and which forms the air-tight seal for the work enclosure means. By utilizing such a construction, the clamp means for effecting the sealed relationship of the structure may be of readily releasable type and, due to the resiliency and effectiveness of the gasket material, may be of relatively simple construction, not requiring excessive pressure or force to effect the seal and also not requiring an excessive number of clamping points peripherally of the work enclosure means.

A further object of the present invention resides in the provision of a unitary furnace structure in which a plurality of work enclosure means, constructed generally in accordance with the above, may be simultaneously placed upon the furnace structure and individually utilized to perform a brazing or like operation therewithin. To this end, the present invention contemplates the utilization of a table construction capable of supporting a plurality of work enclosure means and in such manner as to expose both the top and bottom walls thereof, or at least major portions or areas thereof, and wherein there is utilized in conjunction with such assemblages a heating means movable longitudinally along the table to any one of a series of preselected positions relative thereto for operation upon one of the several individual work enclosure means placed upon the table. The heating means is characterized by upper and lower heating elements or members which are movable relative to each other in such fashion as to be movable between a position closely spaced respectively relative to the top and bottom walls of the work enclosure and a position separate and remote from the work enclosure means to permit removal thereof. The heating elements or members are of smaller size than the cooling frame so as to minimize the possibility of damage to the cooling frame gaskets and to localize the heat directly on either side, top and bottom, of the workpiece sandwiched within the enclosure means.

With the above, and other objects in view that will hereinafter appear, the nature of the invention will be more clearly understood by reference to the following detailed description, the appended claims, and the several views illustrated in the accompanying drawings.

In the drawings:
FIGURE 1 is a front elevational view of a brazing furnace contsructed in accordance with the present invention and illustrating the relative disposition of the heating mechanism relative thereto and showing the heating means in full lines at one of the work stations and in dotted lines in yet another work station;

FIGURE 2 is an end elevational view of the assembly shown in FIGURE 1, illustrating further details of the heating mechanism and illustrating the same operative association with one of the work enclosure means;

FIGURE 3 is an enlarged vertical section through a portion of the furnace assemblage in the region thereof peripherally of one of the work enclosure means and showing one of the clamp elements utilized in conjunction therewith, the clamp being shown in full lines in inoperative position and in dotted lines in operative position;

FIGURE 4 is an exploded perspective view showing portions of the top and bottom walls of the work enclosure means and the manner in which the workpieces are sandwiched therebetween.

FIGURE 5 is a vertical section taken transversely through the furnace assembly and more particularly through one of the work enclosure means therefor, illustrating the relative disposition of the workpieces within the enclosure and also illustrating the clamp means effective to perform the sealing operations and further illustrating the hollow nature of the work enclosure means;

FIGURE 6 is an exploded perspective view showing a portion of the furnace table, the heating means or at least the operative portion thereof and the work enclosure means in its entirety;

FIGURE 7 is a sectional view similar to FIGURE 5 but showing the manner in which the flexible walls are effective to clamp the work within the work enclosure; and FIGURE 8 is a sectioal view taken through a portion of a modified work enclosure assembly utilizing a solid cooling frame.

Referring now more particularly to FIGURE 1, the assembly as shown therein will be seen to consist of a work table indicated generally by the reference character 10, which includes a top plate 11, more specifically described hereinafter, supported by a series of pedestals or legs 12 in proper elevated relationship. The assembly also includes a heating means, indicated generally by the reference character 13, which includes the upper and lower heating members 14 and 15, respectively, supported by a carriage which, in turn, is movably supported on wheels, as will hereinafter appear.

The main plate 11 of the table, as can be seen more clearly in FIGURE 6, is provided with a series of openings 17 therein which are preferably of rectangular shape. These openings, as can be best seen in FIGURE 6, are cooperable with individual work enclosure assemblies for supporting the same with the bottom walls of the enclosure assemblies exposed through the openings 17. Each work enclosure includes a bottom wall 18 which is slightly larger in area than the area of the individual openings 17 so that the peripheral or marginal portions of the bottom wall 18 rest upon the base 11 of the table with the major extent thereof exposed through its associated opening 17 and unsupported throughout the major central extent thereof. Superimposed upon the bottom wall 18 is a resilient gasket member 19 which extends peripherally around the bottom wall 18 and in contact therewith and which is adapted to seat against the bottom surface of a frame indicated generally by the reference character 20. As shown herein, by way of one example, the frame 20 is of open rectangular configuration and is hollow, as more specifically described hereinafter, and is also provided with inlet and outlet connections 21 and 22, respectively, for circulating coolant through the hollow interior of the frame. A further gasket 23 is superimposed upon the frame 20 in between the same and the top wall 24 which is constructed similarly to the bottom wall 18 and which overlies, peripherally thereof, the gasket 23 and the frame 20. A clamping plate 25 rests upon the top wall 24 and is cooperable with the individual clamping assemblies, indicated by reference characters 26, bounding each opening 17 so that when the work enclosure assembly is in place relative to the table top and work is positioned therewithin, as more fully described hereinafter, the clamping means will be operative to urge the clamping plate 25 downwardly and effect compression of the two gaskets 23 and 19 so as to provide, within the interior of the work enclosure assembly, a substantially air-tight enclosure.

The frame 20 is provided, in addition to the inlet and outlet connections 21 and 22 for coolant, with a connection 30 extending to the interior of the frame, that is to say, to the inner side thereof, which is adapted to be connected to a means for evacuating the interior of the work enclosure and is also provided with an inlet connection 31 for an inert gas or mixture thereof, such gas or mixture thereof being characterized by its non-oxidizing characteristics. To assure proper temperature control, thermocouple means (not shown) is also preferably used extending into the interior of the work enclosure so as to provide a continuous indication of the temperature within the enclosure.

The heating members 14 and 15, as can be seen in FIGURE 6, are each in the form of ceramic enclosures 35 and 36 open at their bottom and top sides respectively and containing therewithin a plurality of individual heating elements 37 and 38 of the electrical type and with a terminal block 39 being provided on one side of each such heating assembly having conductors such as 40 extending thereto for connection to the individual heating elements 37 and 39. The block 39 is formed of insulating material and is provided for the purpose of making the proper individual connections to the conductors 40, as is conventional.

The open sides of the heating assemblies 14 and 15 are flat and the outer dimensions thereof are less than the dimensions of the top and bottom walls 24 and 18 so that the ceramic material contacts the top and bottom walls inwardly of the frame 20.

The heating elements 14 and 15, as can be best seen from FIGURES 1 and 2, are carried by any suitable carriage mechanism including the uprights 41 extending vertically from the lower horizontal legs 42 and being provided at their upper ends with a supporting framework assembly 43 overhanging the table structure 10 substantially as shown. The lower horizontal leg 42 journals the pairs of wheels 45 and 46, the former of which are of the flanged type and are engaged with a guide rail 47 and the latter of which are preferably driven rubber wheels so that the carriage assembly is movable longitudinally along the work table to any one of a plurality of selected positions relative thereto for cooperation with the individual work enclosure means supported thereby. The drive means for wheels 46 is not shown since any conventional arrangement may be used, as desired. The framework 43 and the lower leg 42 rigidly mount pneumatic or hydraulic cylinders 49 and 50 having pistons 51 and 52 respectively extending therefrom which are connected at their free ends to their respective heating assemblies 14 and 15. Additionally, each heating assembly carries a pair of vertical posts 54 and 55 in the case of the upper heating element 14 and posts 56 and 57 in the case of the lower heating element 15 which are guidably received in the respective supporting members 43 and 42. Suitable connections are made at the opposite ends of the cylinders 49 and 50 for moving the heating members 14 and 15 toward and away from each other when desired.

Referring now more particularly to FIGURE 4, wherein the disposition of the workpiece within the work enclosure is illustrated, as shown therein, the pieces to be joined are top and bottom plates 60 and 61, respectively, and an intermediate honeycomb core 62, it being the object, in this particular instance, to join the two plates 60 and 61 rigidly on either side of the intermediate core 62. In placing the workpiece within the enclosure, it is preferred to utilize a honeycomb or cellular spacing element 63 which is placed directly upon the bottom wall 18 of the work enclosure means and then, on top of this honeycomb structure 63, a pressure plate 64 is provided, and then the plate 61, the honeycomb core 62 and the plate 60, respectively, on top of the plate 64. This entire assemblage is overlaid with a second pressure plate 65, and then, on top of that, a further cellular or honeycomb piece 66. When this assemblage is properly positioned within the work enclosure means, it assumes a relative relationship substantially as is shown in FIGURE 5. The purpose of the honeycomb pieces 63 and 66 and the pressure plates 64 and 65 is to provide means whereby pressure is evenly distributed throughout the surfaces of the two plates 60 and 61 to properly maintain the same in contact with the intermediate honeycomb core 62 during the heating cycle while at the same time permitting the heat to penetrate rapidly and properly to the workpiece, the same being distributed more evenly thereto by virtue of the pressure plates 64 and 65.

FIGURE 5 illustrates the work as positioned within the work enclosure whereas FIGURE 7 illustrates the manner in which the flexible walls 18 and 24 clamp the work and hold it in place for bonding. In the latter case, the interior of the work enclosure is subjected to subatmospheric pressure. This may be accomplished either by simply evacuating the interior through the line 30 or by filling the interior with an inert or non-oxidizing gas through line 31 while maintaining reduced pressure through line 30. In one case, the atmosphere within the enclosure is air under reduced pressure while in the latter case, the atmosphere is a non-oxidizing gas under reduced pressure. In either case, the reduced pressure within the work enclosure causes the walls 18 and 24 to collapse towards each other and thus clamp the work therebetween, properly holding the same during the subsequent heating cycle.

As can be best seen in FIGURE 3, the means for clamping the periphery of the work enclosure means so as to effect the seal previously described is accomplished by a plurality of clamping elements 26 previously mentioned. Each such clamping means includes a hydraulic or pneumatic cylinder 70 rigidly affixed to the undersurface of the table base 11 and having a piston rod 71 projecting through a suitable aperture 72 therein. The piston rod carries a clevis 73 at its upper extremity, which, in turn, carries a pintle or pin 74 journaling a clamping jaw 75 thereon so as to permit of limited rotation of the clamping jaw 75 relative to the clevis 73 as is shown in full and dotted lines in FIGURE 3. Surrounding each group of clamping elements cooperative with an individual work enclosure means is a guide frame 76 provided with a plurality of vertical grooves 77 on its inner side receiving the outer edges of the clamping jaws 75, substantially as is shown. The pin connection 74 to the clamping jaws 75 is slightly offset relative to the center of mass thereof so as to permit these clamping jaws to tip backwardly away from the work enclosure means when these rods 71 are elevated or extended relative to their respective cylinders 70. Then, when the piston rods 71 are retracted into the cylinders 70, the guide means 76 will cause them to properly locate relative to the work enclosure means and to clamp thereupon, as is shown in dotted lines in FIGURE 3. Suitable connections 78 and 79 are made to the individual cylinders 70 for the purpose of effecting the extension and retraction of the piston rods 71 thereof. All of the hydraulic or pneumatic connections to the various individual cylinders 70 are made through the manifold lines 80 and 81, see particularly FIGURE 1.

It should be noted that the frame 20 need not, in all instances, be water cooled. It may, under some circumstances, be made of solid form. For example, at any time that extensive heating is not necessary, as when the work is of very lightweight section, a solid frame could be used.

The principle is illustrated in FIGURE 8. In this figure, a solid cooling frame 120 is shown having associated gaskets 121 and 122. Since the same clamping means will normally be used and since the thickness of the solid frame 120 is materially less than the water cooled type, a suitable space frame 123 may be necessary to obtain the clamping action. In this modification, the flexible work enclosure walls 124 and 125 are preshaped somewhat, each being provided with a dished central area 126 or 127 of slightly greater area than the work 128 so that these preshaped dished areas in themselves more or less form the work enclosure space.

The wall members 124 and 125 are also preferably preshaped in their peripheral areas as indicated by the sloped portions 130 and 131 so that their marginal edges 132 and 133 will be spaced apart sufficiently to admit the chill frame and gaskets therebetween. At the same time, it will be appreciated that the preshaping reduces the space to be evacuated. To this end, the solid chill frame 120 is of course provided with the necessary connections, as through the opening 134 to evacuate the work space. Also, since the wall portions surrounding the work and lying between the dished areas 126 and 127 and the sloped areas 130 and 131 may tend to isolate the spaces 140 and 141, a tube 142 is preferably used to assure vacuum communication between these spaces.

The modification as illustrated in FIGURE 8 finds application in those cases where the work piece assembly is of very lightweight construction so that the heating cycle would be of short enough duration as not to require a water cooled frame to prevent heat damage of the gaskets.

On longer sections, the water cooled frame 20 is quite necessary and indeed, in many instances in connection with such larger work, means for rapidly cooling the work and its enclosure assembly may be desired. For this purpose chill blocks such as are shown in FIGURE 1 may be used. In this figure, a carriage 100 having a base 101 provided with wheels 102 carries a pair of chill blocks 103 and 104. The carriage 100 operates on the same principle as the carriage for the heating elements except that carriage 100 is movable into position at any work station laterally of the path along which the heating means 13 moves. Carriage 100 mounts the chill blocks 103 and 104 so as to be movable toward and away from each other, any suitable means (not shown) to effect such movement being utilized. Preferably, the chill blocks 103 and 104 are water cooled, although they may simply be in the form of solid blocks if desired. There purpose is to contact the walls 18 and 24 after the heating cycle is completed and thus cool such walls and the work assembly therebetween as rapidly as possible in order to permit the work to be removed as soon as possible.

It will also be appreciated that a central control panel (not shown) may be used to effect various of the operations remotely. For example, movement of the heating means 13 to any one of the stations may be accomplished from such a panel by providing some means for driving the heating assembly, such means being controlled from the panel. Likewise, movement of the heating elements toward and away from the work station as well as control of the heat applied could be controlled from such a panel, in which latter case, the previously mentioned thermocouples could be used to automatically control the heat applied in response to a particular setting selected at the control panel. By the same token, it will be appreciated that the apparatus may be entirely manual, semi-automatic or fully automatic without departing from the spirit of the invention itself.

Similarly, it will be appreciated that the invention may be used to advantage for many processes. For example, sintering operations may be performed as well as various bonding operations of which brazing is only one and in other instances, it may be to advantage to utilize the apparatus in heat treatment work. In all cases, however, the primary advantage of the device is the rapidity with which the processing may be accomplished. This, coupled with the fact that the construction and principle of operation lend themselves readily to a multi-station apparatus renders the mechanism extremely flexible and economical of operation.

In regard to flexibility, the present apparatus may be used for relatively low temperature work as in the bonding of plastics and, as well, can be used for very high temperature brazing or the like.

It is well to mention also that the present invention is not limited to use in conjunction with flat work as is shown in FIGURES 5 and 7. The work may be of any desired shape, in which case the filler or spacing member 63 and 66 would have their opposing surfaces formed complementary to the work and with flat surfaces to engage the flexible upper and lower walls 24 and 18.

For relatively large work, it may be desirable to plan additional filler or spacer members between the walls 18 and 24 around the work and between the same and the chill frame 20 in order to minimize buckling of walls 18 and 24.

What is claimed is:

1. Apparatus of the character described comprising a work enclosure assembly and heating means cooperable therewith, said work enclosure assembly comprising a table having a horizontally disposed and elevated open frame, spaced top and bottom walls of flexible metallic sheet supported peripherally thereof on said frame leaving the major portion of such walls, inwardly of their peripheries, free and unsupported, said heating means being in the form of a pair of vertically spaced heating members disposed respectively above and below said frame and movable toward and away from each other so as to contact said top and bottom walls, the areas of said heating members in contact with said top and bottom walls being smaller than the unsupported areas of such walls, work-engageable heat transfer means adapted to maintain the original spacing of said top and bottom walls, and means for maintaining an atmosphere under reduced pressure within the region bounded by said frame and said walls to urge said flexible walls toward each other to clamp the heat transfer means and work therebetween.

2. A multi-station heat bonding assembly comprising an elongate table having a plurality of openings therein and a work enclosure assembly associated with each opening, a carriage movable longitudinally of said table, heating means carried by said carriage comprising upper and lower heating members mounted for movement toward and away from each other and positioned respectively above and below said table, a second carriage movable laterally of the path of the first carriage and positionable at any one of the table openings, upper and lower chill blocks vertically movably mounted on said second carriage and positioned respectively above and below said table to contact an associated work enclosure assembly and rapidly cool the same subsequent to heating thereof by said heating means.

3. A multi-station heat bonding assembly comprising an elongate table having a plurality of openings therein and a work enclosure assembly associated with each opening, a carriage movable longitudinally of said table, heating means carried by said carriage comprising upper and lower heating members mounted for movement toward and away from each other and positioned respectively above and below said table, a second carriage movable laterally of the path of the first carriage and positionable at any one of the table openings, upper and lower chill blocks vertically movably mounted on said second carriage and positioned respectively above and below said table to contact an associated work enclosure assembly and rapidly cool the same subsequent to heating thereof by said heating means, said chill blocks being water cooled.

References Cited in the file of this patent

UNITED STATES PATENTS

| | | |
|---|---|---|
| 2,332,368 | Burtonshaw | Oct. 19, 1943 |
| 2,423,870 | Blessing | July 15, 1947 |
| 2,537,918 | Skoog | Jan. 9, 1951 |
| 2,672,837 | Maher | Mar. 23, 1954 |
| 2,693,636 | Simpelaar | Nov. 9, 1954 |
| 2,771,048 | Zimmerman | Nov. 20, 1956 |
| 2,845,698 | Giovannucci et al. | Aug. 5, 1958 |
| 2,945,976 | Fridrich et al. | July 19, 1960 |
| 2,984,732 | Herbert | May 16, 1961 |
| 3,011,926 | Rowe | Dec. 5, 1961 |
| 3,053,969 | Kerr et al. | Sept. 11, 1962 |
| 3,064,118 | Bukata | Nov. 13, 1962 |

FOREIGN PATENTS

| | | |
|---|---|---|
| 1,162,692 | France | Apr. 14, 1958 |

OTHER REFERENCES

The Tool Engineer, September 1958 (pages 98–101 relied on). Copy in Scientific Library.

Product Engineering, mid-September 1959 (pages 375–377 relied on). Copy in Scientific Library.